US011533372B2

(12) United States Patent
Ben-Shimon et al.

(10) Patent No.: US 11,533,372 B2
(45) Date of Patent: Dec. 20, 2022

(54) PROXYLESS PROTOCOL

(71) Applicant: Google LLC, Mountain View, CA (US)

(72) Inventors: Sonny Ben-Shimon, Tel-Aviv (IL); Uri Goren, Rishon LeZion (IL); Daniel Berkovitch, Bridgewater, NJ (US); Ittai Balaban, Mishmarot (IL); Alok Kumar, Mountain View, CA (US); Parveen Patel, Mountain View, CA (US); Pierre-emmanuel Ettori, Sunnyvale, CA (US); Anshuman Gupta, Mountain View, CA (US); Idan Brown, Mountain View, CA (US); Noam Lampert, Tel-Aviv (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/219,705

(22) Filed: Mar. 31, 2021

(65) Prior Publication Data

US 2022/0321667 A1    Oct. 6, 2022

(51) Int. Cl.
*H04L 29/06* (2006.01)
*H04L 67/141* (2022.01)
(Continued)

(52) U.S. Cl.
CPC .......... *H04L 67/141* (2013.01); *H04L 5/0055* (2013.01); *H04L 67/56* (2022.05); *H04L 69/326* (2013.01)

(58) Field of Classification Search
CPC ..... H04L 67/141; H04L 67/28; H04L 5/0055; H04L 69/326
See application file for complete search history.

(56) References Cited

U.S. PATENT DOCUMENTS

| 8,180,902 B1* | 5/2012 | Day ............... H04L 63/029 709/227 |
| 8,355,405 B2 | 1/2013 | Somech et al. |

(Continued)

FOREIGN PATENT DOCUMENTS

| WO | 2015/167375 | 11/2015 |
| WO | 2015/167375 A1 | 11/2015 |

OTHER PUBLICATIONS

Jun. 20, 2022 Written Opinion (WO) of the International Searching Authority (ISA) and International Search Report (ISR) issued in International Application No. PCT/US2022/021444.
(Continued)

*Primary Examiner* — Brian J. Gillis
*Assistant Examiner* — Juan C Turriate Gastulo
(74) *Attorney, Agent, or Firm* — Honigman LLP; Brett A. Krueger

(57) ABSTRACT

A method for a proxyless protocol includes intercepting, from a client, a first Transmission Control Protocol (TCP) connection request requesting to establish a TCP connection between the client and a proxy for routing data to a destination server. The request includes client information and a first sequence number. The method also includes transmitting, to the destination server, a second TCP connection request to establish a TCP connection between the client and the destination server. The second request includes a second sequence number less than the first sequence number. The method also includes intercepting, from the destination server, an acknowledgment message indicating acknowledgment of the second TCP connection request. The method also includes transmitting, to the destination server, a proxy protocol header message with the client information. The method also includes generating a new acknowledgment message using the first TCP connection request and transmitting, to the client, the new acknowledgment message.

20 Claims, 6 Drawing Sheets

(51) Int. Cl.
  *H04L 69/326*  (2022.01)
  *H04L 5/00*    (2006.01)
  *H04L 67/56*   (2022.01)

(56) References Cited

U.S. PATENT DOCUMENTS

| | | | | |
|---|---|---|---|---|
| 8,806,011 | B1* | 8/2014 | Graham-Cumming | H04L 63/1458 709/225 |
| 2006/0047839 | A1* | 3/2006 | Tate | H04L 69/16 709/230 |
| 2007/0283023 | A1* | 12/2007 | Ly | H04L 69/16 709/227 |
| 2015/0312384 | A1* | 10/2015 | Sankaran | H04L 67/2804 709/203 |
| 2019/0230038 | A1* | 7/2019 | Hughes | H04L 47/2441 |
| 2020/0162432 | A1* | 5/2020 | Ludin | H04L 63/20 |

OTHER PUBLICATIONS

Binder Andrej et al: "A SDN Based Method of TCP Connection Handover", Nov. 19, 2015 (Nov. 19, 2015), Computer Vision—ECCV 2020: 16th European Conference, Glasgow, UK, Aug. 23-28, 2020: Proceedings; [Lecture Notes in Computer Science ; ISSN 0302-9743], Springer International Publishing, Cham, pp. 13-19.

\* cited by examiner

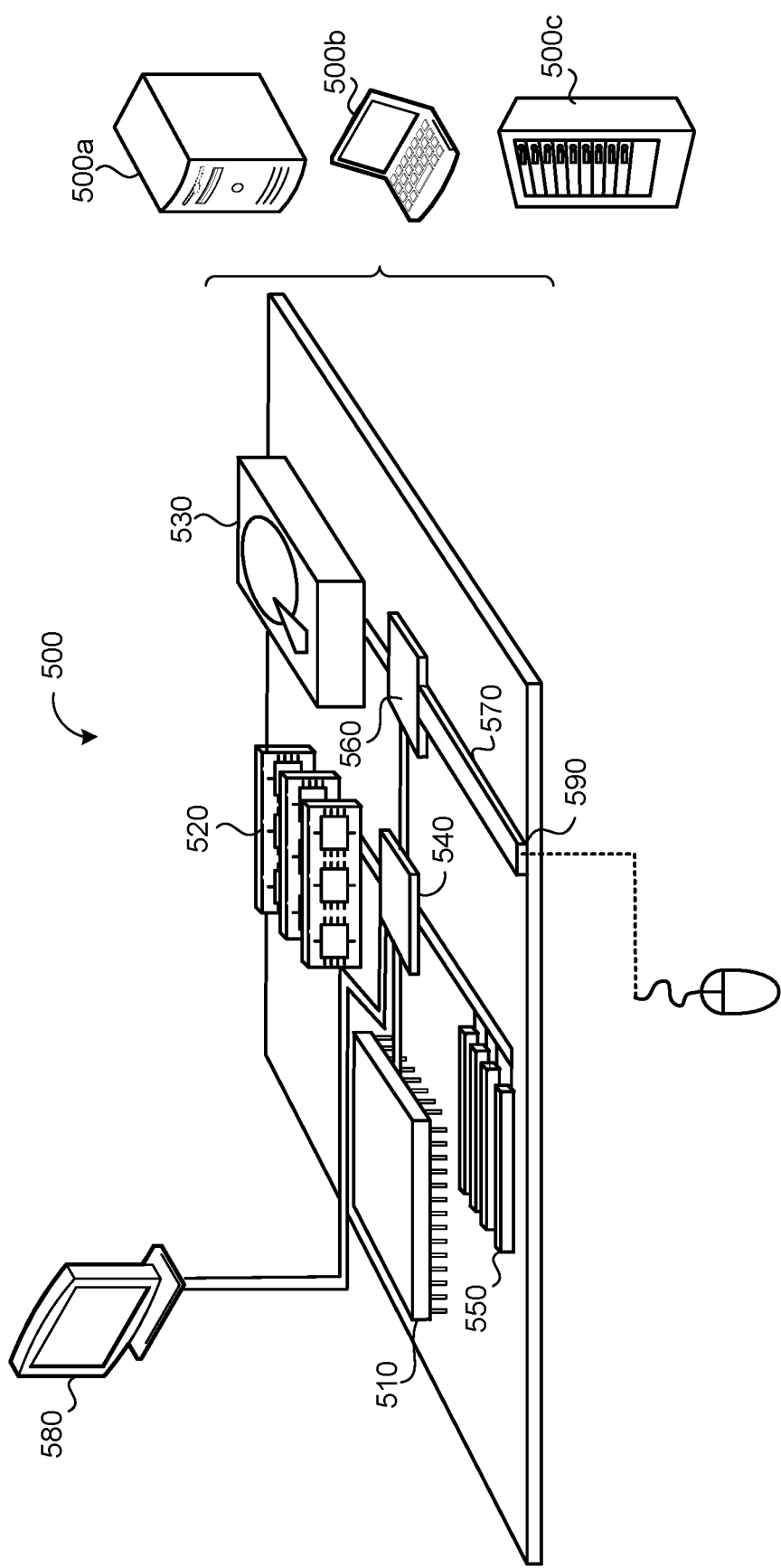

PROXYLESS PROTOCOL

TECHNICAL FIELD

This disclosure relates to a proxyless protocol such as for a proxyless proxy protocol.

BACKGROUND

In multi-tiered network serving architectures, client-server communication often travels through one or more proxies. A proxy is a server application or appliance that acts as an intermediary or gateway between a client and one or more destinations. That is, instead of a client directly connecting to a destination device to access a resource, the client instead directs the request to the proxy which evaluates the request based on rules governing the proxy's behavior. Because proxies act as intermediary, the destination devices may lose access to information regarding the clients.

SUMMARY

One aspect of the disclosure provides a computer-implemented method for a proxyless protocol that when executed by data processing hardware causes the data processing hardware to perform operations. The operations include intercepting, from a client, a first Transmission Control Protocol (TCP) connection request requesting to establish a first TCP connection between the client and a proxy server for routing data through the proxy server to a destination server. The first TCP connection request includes client information and a first sequence number. The method also includes transmitting, to the destination server, a second TCP connection request requesting to establish a second TCP connection between the client and the destination server. The second TCP connection request includes a second sequence number less than the first sequence number. The method includes intercepting, from the destination server, an acknowledgment message indicating acknowledgment of the second TCP connection request and transmitting, to the destination server, a data packet including a proxy protocol header message including the client information. The method also includes generating a new acknowledgment message using the first TCP connection request and transmitting, to the client, the new acknowledgment message.

Implementations of the disclosure may include one or more of the following optional features. In some implementations, the operations further include, prior to intercepting the TCP connection request from the client, obtaining client configuration data that indicates an intent of the client to communicate with the proxy server. In some examples, the client configuration data includes a destination identifier that identifies the destination server. In these examples, the operations further include, after intercepting the TCP connection request from the client, determining that the client intends to communicate with the proxy server using the destination identifier.

Optionally, the destination identifier is an Internet Protocol (IP) address. Intercepting the first TCP connection request from the client may include determining that a SYN flag is set within the first TCP connection request. In some implementations, a difference between the first sequence number and the second sequence number is equal to a size of the proxy protocol header message.

The acknowledgment message may include connection configuration information. The new acknowledgment message may include the same connection configuration information as the acknowledgment message. In some examples, after transmitting the new acknowledgment message to the client, the client and the destination server communicate directly. The client may be remote from the destination server and the first TCP connection request may be intercepted at the client. The client may be remote from the destination server and the first TCP connection request may be intercepted at the destination server.

Another aspect of the disclosure provides a system for a proxyless protocol. The system includes data processing hardware and memory hardware in communication with the data processing hardware. The memory hardware stores instructions that when executed on the data processing hardware cause the data processing hardware to perform operations. The operations include intercepting, from a client, a first Transmission Control Protocol (TCP) connection request requesting to establish a first TCP connection between the client and a proxy server for routing data through the proxy server to a destination server. The first TCP connection request includes client information and a first sequence number. The method also includes transmitting, to the destination server, a second TCP connection request requesting to establish a second TCP connection between the client and the destination server. The second TCP connection request includes a second sequence number less than the first sequence number. The method includes intercepting, from the destination server, an acknowledgment message indicating acknowledgment of the second TCP connection request and transmitting, to the destination server, a data packet including a proxy protocol header message including the client information. The method also includes generating a new acknowledgment message using the first TCP connection request and transmitting, to the client, the new acknowledgment message.

This aspect may include one or more of the following optional features. In some implementations, the operations further include, prior to intercepting the TCP connection request from the client, obtaining client configuration data that indicates an intent of the client to communicate with the proxy server. In some examples, the client configuration data includes a destination identifier that identifies the destination server. In these examples, the operations further include, after intercepting the TCP connection request from the client, determining that the client intends to communicate with the proxy server using the destination identifier.

Optionally, the destination identifier is an Internet Protocol (IP) address. Intercepting the first TCP connection request from the client may include determining that a SYN flag is set within the first TCP connection request. In some implementations, a difference between the first sequence number and the second sequence number is equal to a size of the proxy protocol header message.

The acknowledgment message may include connection configuration information. The new acknowledgment message may include the same connection configuration information as the acknowledgment message. In some examples, after transmitting the new acknowledgment message to the client, the client and the destination server communicate directly. The client may be remote from the destination server and the first TCP connection request may be intercepted at the client. The client may be remote from the destination server and the first TCP connection request may be intercepted at the destination server.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is a schematic view of an example computing device that may be used to implement the systems and methods described herein.

Like reference symbols in the various drawings indicate like elements.

DETAILED DESCRIPTION

Figure 1:
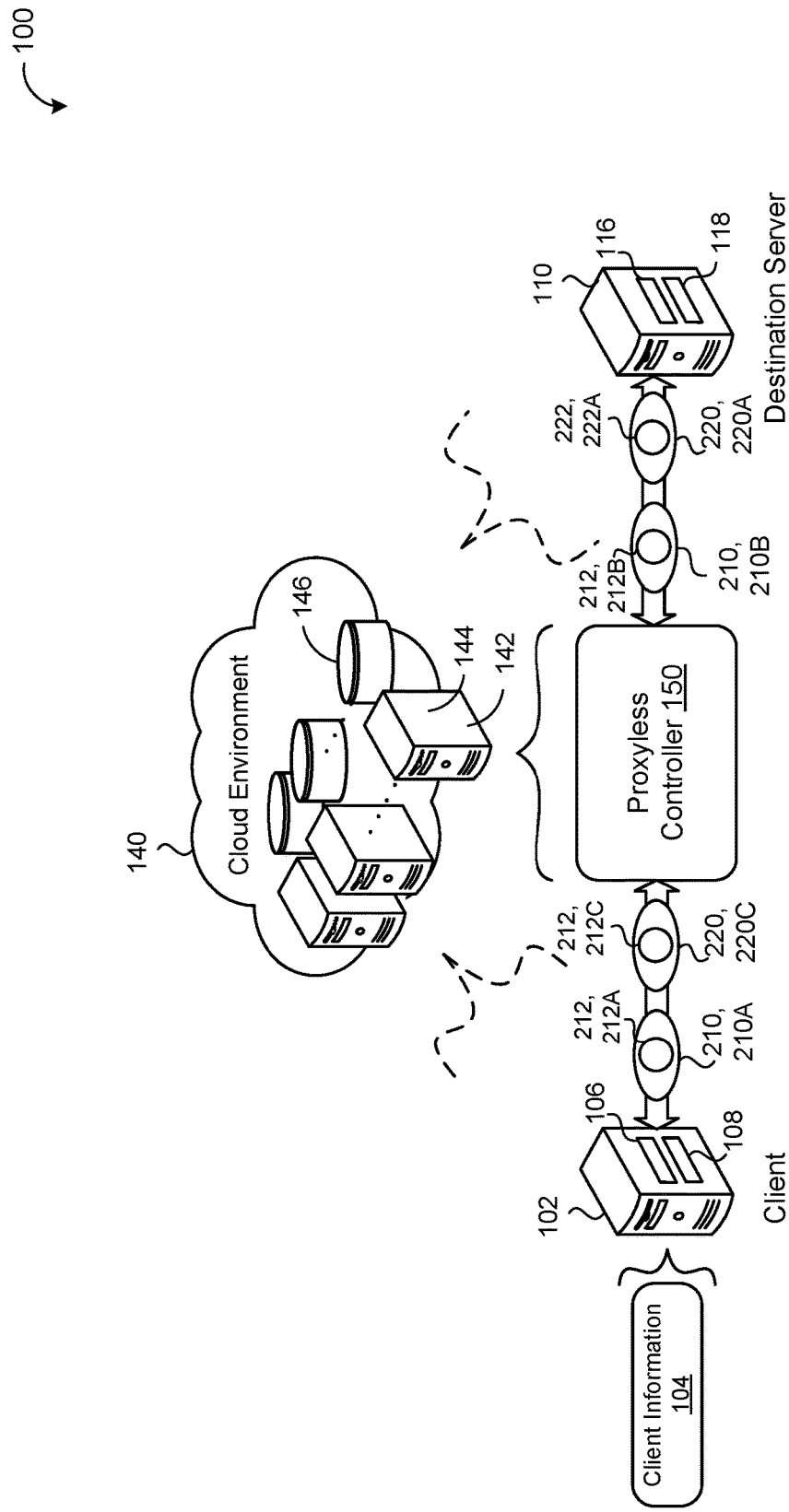
FIG. 1 is a schematic view of an example system for providing a proxyless protocol.

In multi-tiered network serving architectures, client-server communication frequently travels through one or more proxies. Some proxies (e.g., a load balancer) will terminate a Transmission Control Protocol (TCP) connection and proxy the data from the client to the destination device (e.g., a server) using a new session. The TCP session handled by the destination server will thus contain the Internet Protocol (IP) address and other identifiers of the proxy rather than the identifiers of the original client initiating the connection. This loss of information often makes it harder for servers and other destinations to apply client-specific policies such as billing, auditing, access control lists, etc. Some protocols (e.g., Proxy Protocol) attempt to address this by allowing the transfer of client-side identifying information to the server. For example, some protocols have the proxy prepend the client-side information in a payload of the new TCP connection the proxy establishes with the server (or next-hop proxy). This client-side information for a TCP connection is usually an original 5-tuple, but it may be augmented per use case. This preamble (also referred to as a header) can be encoded in a human readable format or a binary format.

In modern Software Defined Networks (SDNs), network proxies become control-plane constructs, and there is no physical hop that traffic is routed through. This has a major advantage of removing single points of failure and provides elasticity, performance, and scalability. On the other hand, the lack of a physical proxy introduces a major challenge for supporting third-party solutions which require the client side information (e.g., via the Proxy Protocol). These third-party solutions expect traffic to be explicitly modified by a proxy on the data plane which does not exist. Many cloud customers require the capability to "lift and shift" existing workloads across different deployments (i.e., transition workloads to different deployments without requiring reconfiguration). When the original deployment relies on proxies, this can become a technical blocker to perform the shift without major modifications to the network architecture or provide a crippled solution which does not take advantage of the full capabilities of the SDN.

Implementations herein are directed toward a proxyless controller that emulates the existence of a proxy for preconfigured workloads without sacrificing the advantages of an SDN. The proxyless controller intercepts a TCP connection request from a client that is configured to communicate with a proxy. The TCP connection request includes a first sequence number. The proxyless controller injects client information into the client's TCP connection with a destination server and thus provides client identification data to the destination server in lieu of a proxy. The proxyless controller establishes the connection with the destination server using a second sequence number that is based on the first sequence number provided by the client. The proxyless controller transmits an acknowledgment to the client based on an updated sequence number which allows the client and destination server to communicate without the need for per-packet modification. This avoids the very high throughput cost such modification incurs and allows the proxyless controller to provide near line-rate packet processing. While examples herein discuss implementations with respect to TCP connections, other connection-oriented protocols may also be implemented using the same principles.

Referring to FIG. 1, in some implementations, an example system 100 includes a client device 102 (herein also referred to as a client 102) part of or in communication (e.g., via a network) with a computing system 140. The client device 10 may correspond to any computing device, such as a desktop workstation, a laptop workstation, a server, or a mobile device (i.e., a smart phone). The client device 102 includes computing resources 108 (e.g., data processing hardware) and/or storage resources 106 (e.g., memory hardware). The client 102 is associated with client information 104. The client information 104 may include any information that identifies the client 102, such as IP addresses, source ports, destination ports, identification numbers, etc.

The computing system 140 may be a single computer, multiple computers, or a distributed system (e.g., a cloud environment) having scalable / elastic computing resources 144 (e.g., data processing hardware) and/or storage resources 142 (e.g., memory hardware). A data store 146 (i.e., a remote storage device 146) may be overlain on the storage resources 142 to allow scalable use of the storage resources 142 by one or more of the client or computing resources 144.

The client 102 is configured to communicate with a destination server 110 or other networked computing device via a proxy. The destination server 110 includes computing resources 118 (e.g., data processing hardware) and/or storage resources 116 (e.g., memory hardware). The client 102, in order to communicate with the destination server 110, attempts to transmit a first TCP connection request 210, 210A to a proxy.

The computing system 140 executes a proxyless controller 150 that intercepts the TCP connection request 210A. In some examples, the client 102 executes on the computing system 140 and thus the proxyless controller 150 has access to the client's network traffic which allows the proxyless controller 150 to intercept the TCP connection request 210A. In other examples, the destination server 110 executes on the computing system 140 and the client 102 directs the TCP connection request 210A to the computing system 140 which allows the proxyless controller 150 to intercept the TCP connection request 210A. In yet other examples, both the client 102 and the destination server 110 execute on the computing system 140 (e.g., as part of a distributed system) which also allows the proxyless controller 150 to intercept the TCP connection request 210A. Optionally, the computing system 140 operates as a network address translation (NAT) device for either or both the client 102 and the destination server 110 (i.e., an ingress NAT and/or an egress NAT).

The proxyless controller 150, upon intercepting the TCP connection request 210A, may determine that the TCP connection request 210A is a new connection that is attempting to connect to a proxy (e.g., a virtual TCP endpoint or other intermediary). Optionally, the TCP connection request 210A from the client 102 establishes a connection with a virtual TCP endpoint (i.e., no physical host exists). In some examples, an owner of the client 102, prior to the client 102 initiating the TCP connection request 210A, provides configuration data to the computing system 140 such that the computing system 140 recognizes that the TCP connection request 210A is from the client 102 and intends to connect to a proxy. For example, the owner of the client 102 may provide configuration information that identifies a source IP address or a destination IP address of the TCP connection request 210A and when the proxyless controller 150 receives or intercepts the TCP connection request 210A, the proxyless controller 150 may compare the source or destination IP address (or any other parameter) against the configuration information to determine that the TCP connection request 210A is intended for a proxy.

The TCP connection request 210A includes a first sequence number 212, 212A. All bytes in a TCP connection are numbered, beginning at a randomly selected initial sequence number 212 (i.e., an ISN). After the initial SYN packet, the sequence number 212 is incremented for each data byte transferred between the source and destination. Thus, the sequence number 212 represents a first byte number of a first byte of data in a TCP packet. The receiver acknowledges a message by responding with an acknowledgment number 222 that matches the sequence number 212 of the next byte the receiver expects to receive.

The proxyless controller 150, after intercepting the first TCP connection request 210A and determining the client's intent to establish a connection with a proxy, transmits, to the destination server 110, a second TCP connection request 210, 210B that requests to establish a TCP connection between the client 102 and the destination server 110. The second TCP connection request 210B includes a second sequence number 212, 212B. The second sequence number 212B, as discussed in more detail below, is less than (i.e., smaller) than the first sequence number 212A. In some examples, the second TCP connection request 210B is the first TCP connection request 210A with a modified sequence number 212 (i.e., a smaller sequence number 212). That is, in some examples, the proxyless controller "hijacks" the first TCP connection request 210A and replaces the first TCP connection request 210A with the second TCP connection request 210B (which may be a modified form of the first TCP connection request 210A).

The proxyless controller 150 intercepts or receives, from the destination server 110, a first acknowledgment message 220, 220A indicating acknowledgment of the second TCP connection request 210B. The first acknowledgment message 220A may include a first acknowledgment number 222, 222A associated with the second sequence number 212B. For example, the first acknowledgment number 222A is one greater than the second sequence number 212B, which indicates that the destination server 110 has acknowledged the second TCP connection request 210B.

Figure 2A:
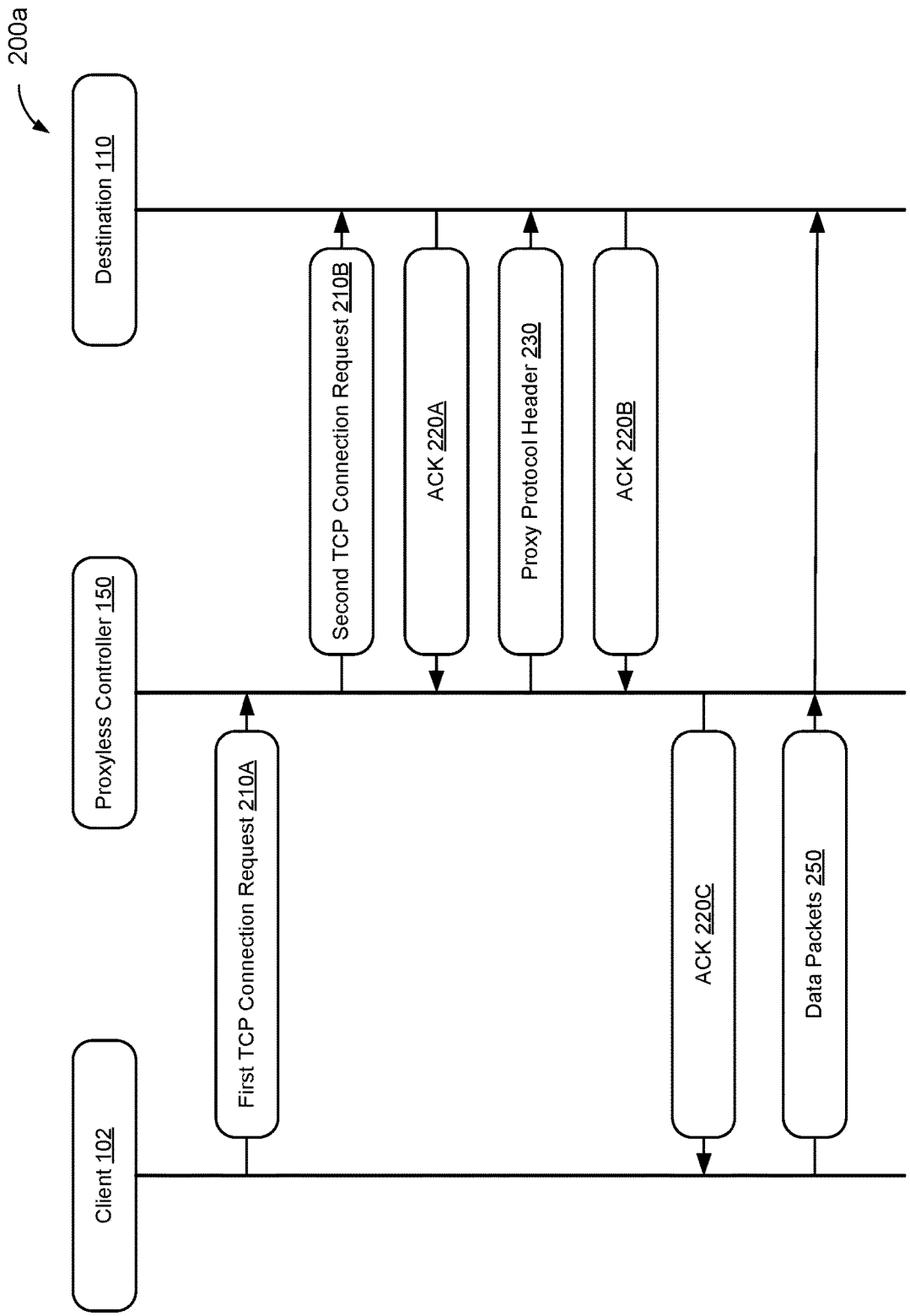
FIG. 2A is an exemplary sequence diagram for the system of FIG. 1.

The proxyless controller 150, after receiving the first acknowledgment message 220A from the destination server 110, transmits the client information 104 to the destination server 110. For example, the proxyless controller 150 transmits a proxy protocol header 230 (FIG. 2) data packet (or other similar data packet) to the destination server 110. The proxy protocol header 230 may include, in the data payload, some or all of the client information 104. The proxy protocol header 230 is merely exemplary and the proxyless controller 150 may "inject" any data in any format to the destination server 110 to facilitate the network connection. The destination server 110 responds to the proxy protocol header 230 with a second acknowledgment message 220B (FIG. 2A). In some examples, the proxyless controller 150 updates the first acknowledgment message 220A previously received from the destination server 110 based on the first sequence number 212A and transmits the updated acknowledgment message 220C with an updated sequence number 212C to the client 102. The updated sequence number 212C corresponds to the sequence number the client 102 expects to receive in response to the first TCP connection request 210A. In other examples, the proxyless controller 150 updates a different acknowledgment message 220 (e.g., the second acknowledgment message 220B) or generates an entirely new acknowledgment message 220 as opposed to modifying or updating a previously received acknowledgment message 220. Importantly, all of these solutions are equivalent as long as the acknowledgment message 220 sent by the proxyless controller 150 to the client 102 includes any necessary information from previous acknowledgment messages 220 received from the destination server 110 (e.g., TCP options), the sequence number 212 the client 102 expects, and the acknowledgment number 222 last sent by the destination server 110. Thus, when generating the acknowledgment message 220C, the proxyless controller may use portions of the TCP connection request 210A (e.g., the sequence number 212) and or the previous acknowledgment messages 220A, 220B (e.g., any TCP options, the acknowledgment numbers 222, etc.).

The proxyless controller 150, in some examples, retransmits and/or regenerates any message between the client 102 and the destination 110 that is dropped or otherwise lost. When a packet is dropped or lost, the proxyless controller 150 may replay payloads from the lost packets.

Referring now to FIG. 2A, a sequence diagram 200a provides an exemplary series of messages between the client 102, the proxyless controller 150, and the destination server 110. First, the client 102 attempts to transmit the first TCP connection request 210A to a proxy, however the proxyless controller 150 receives or intercepts the TCP connection request 210A. The proxyless controller 150 may determine, based on the previously received configuration information, that the client 102 intends to establish a connection with a proxy to communicate with the destination server 110. In response, the proxyless controller 150 transmits the second TCP connection request 210B to the destination server 110. The destination server 110 responds to the second TCP connection request 210B with the acknowledgment message 220A (i.e., a SYN|ACK). In response to the acknowledgment message 220A, the proxyless controller 150 transmits the proxy protocol header 230 to the destination server 110 which provides the destination server 130 with the client information 104, which allows the destination server 110 the capability of providing client-specific policies (e.g., access control lists, etc.).

The destination server 110 acknowledges the proxy protocol header 230 with another acknowledgment message 220B. The proxyless controller 150, in response to the second acknowledgment message 220B, generates a new acknowledgment message or updates the first (or second or generates a new) acknowledgment message 220A and transmits the new or updated acknowledgment message 220C to the client 102. The new acknowledgment message 220C includes an updated acknowledgment number 222C. The client 102, having received an appropriate acknowledgment to its TCP connection request 210A, continues to communicate with the destination server 110 via data packets 250. In this scenario, the client may be configured and/or expect to communicate with the destination server 110 via a proxy and the destination server 110 may also be configured and/or expect to communicate with the client 102 via a proxy, but in actuality the client 102 and the destination server 110 communicate without a proxy.

The sequence diagram 200a is exemplary only and the order and number of messages may change depending upon the implementation needs of a specific system. For example, a client 102 may use TCP fast open to include a data payload in the original TCP connection request 210A. In this scenario, the proxyless controller 150 may initially drop the data payload and replay the data to the destination server 110 after the TCP connection is established by properly adjusting the sequence number 212B.

Figure 2B:
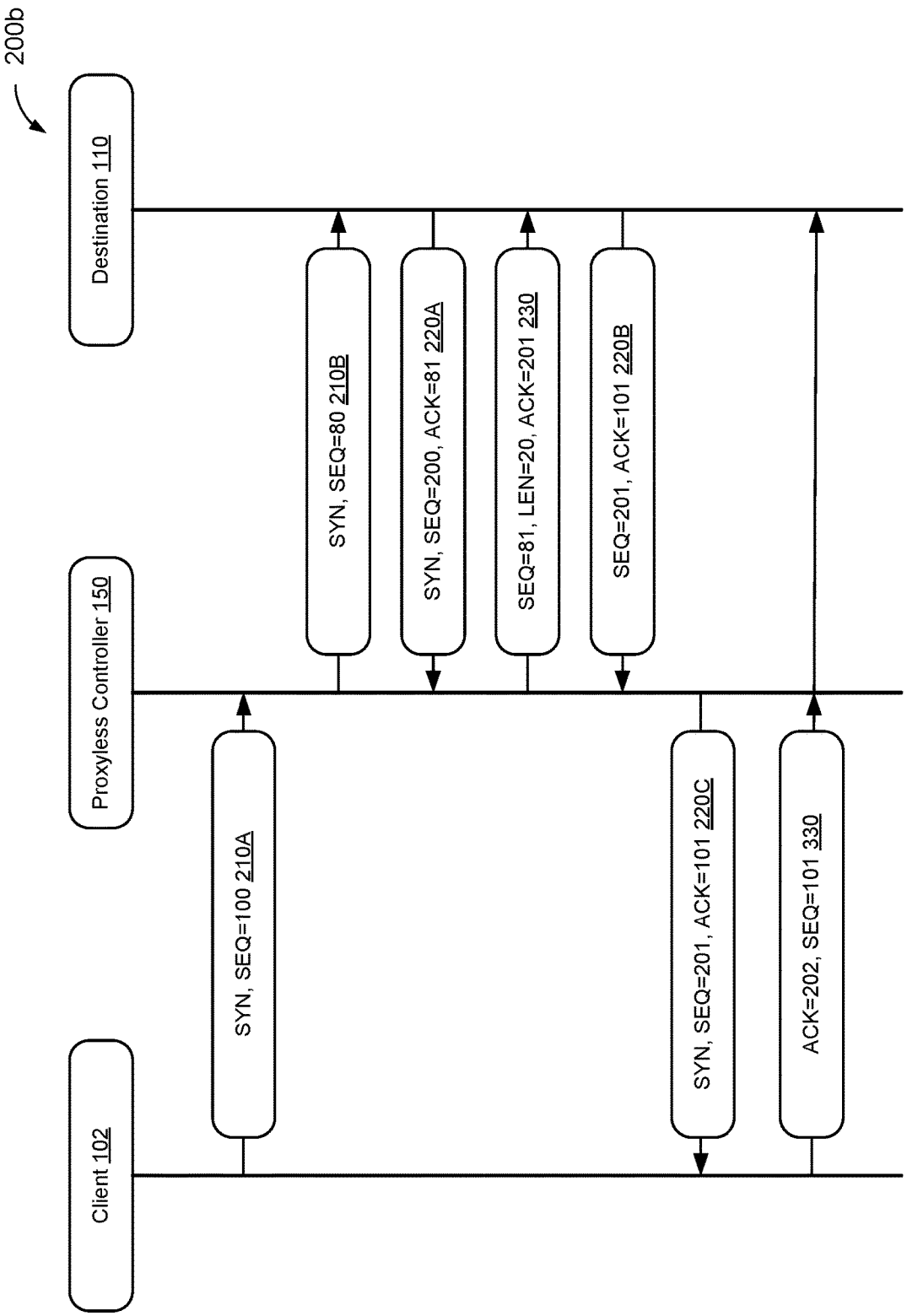
FIG. 2B is another exemplary sequence diagram for the system of FIG. 1.

Referring now to FIG. 2B, a sequence diagram 200b provides the same exemplary series of messages as the sequence diagram 200a, but with additional detail regarding the sequence numbers 212 and acknowledgment numbers 222. Here, the client 102 transmits the first TCP connection request 210A (i.e., a SYN packet) with a sequence number 212A equal to "100." It is important to note that the client 102 expects an acknowledgment message 220 with an acknowledgment number 222 equal to "101" in response to the TCP connection request 210A. The proxyless controller 150 receives the TCP connection request 210A and determines that the client 102 intends to establish a connection to the destination server 110 via a proxy. The proxyless controller 150 transmits the second TCP connection request 210B (i.e., another SYN packet) to the destination server 110 with a sequence number 212B equal to "80." In this example, the proxyless controller 150 determines the second sequence number 212B by rolling back or decrementing the first sequence number 212A (transmitted by the client 102 in the first TCP connection request 210A) by an amount equal to an amount of data in the proxy protocol header 230. Here, the proxyless controller 150 intends to transmit 20 bytes of data in the proxy protocol header 230 (which includes the client information 104). Thus, 100 (i.e., the sequence number 212A) minus 20 (i.e., the number of bytes in the proxy protocol header 230) is equal to "80." The proxyless controller 150 may set the second sequence number 212B to any value less than the first sequence number 212A dependent on the amount of data the proxyless controller 150 intends to transmit to the destination server 110 prior to acknowledging the connection to the client 102.

Next, the proxyless controller 150 receives the acknowledgment message 220A (i.e., a SYN|ACK packet) with sequence number 212 equal to "200" and an acknowledgment number 222 equal to "81." The acknowledgment number 222 of "81" acknowledges the sequence number 212 of "80" previously transmitted by the proxyless controller 150. After receiving the acknowledgment message 220A, the proxyless controller 150 proceeds with transmitting the proxy protocol header 230 (and/or any other data the destination server 110 may desire or require). Here, the sequence number 212 is equal to "81" (matching the previous acknowledgment number 222A), the length is "20" (i.e., 20 bytes), and the acknowledgment number 222 is equal to "201" (matching the sequence number 212 of "200" previously provided by the destination server 110). The destination server 110 acknowledges the proxy protocol header 230 with the acknowledgment message 220B which includes a sequence number 212 equal to "201" and an acknowledgment number 222 equal to "101."

The proxyless controller 150 updates the acknowledgment message 220A (which may include important connection information required by the client 102) based on the sequence number 212A from the original TCP connection request 210A from the client 102. That is, the proxyless controller 150 substitutes the original acknowledgement number 222A with an updated acknowledgment number 222 that the client 102 expects in response to the TCP connection request 210A. In this example, the proxyless controller 150 transmits an acknowledgement message 220C (i.e., a SYN packet) with a sequence number 212 equal to "201" (to match the sequence number 212 provided by the acknowledgment message 220B) and an acknowledgment number 222 equal to "101" (to match the acknowledgment number 222 expected by the client 102 in response to the TCP connection request 210A). From this point on, the client 102 and destination server 110 are free to communicate with the proxyless controller 150 merely forwarding packets 250 between the two (i.e., no deep inspection or modification of the packets required). For example, the client 102 follows up with a data packet 250 that includes a sequence number 212 equal to "101" and an acknowledgment number 222 equal to "202" which aligns with the expectations of the destination server 110.

Figure 3:
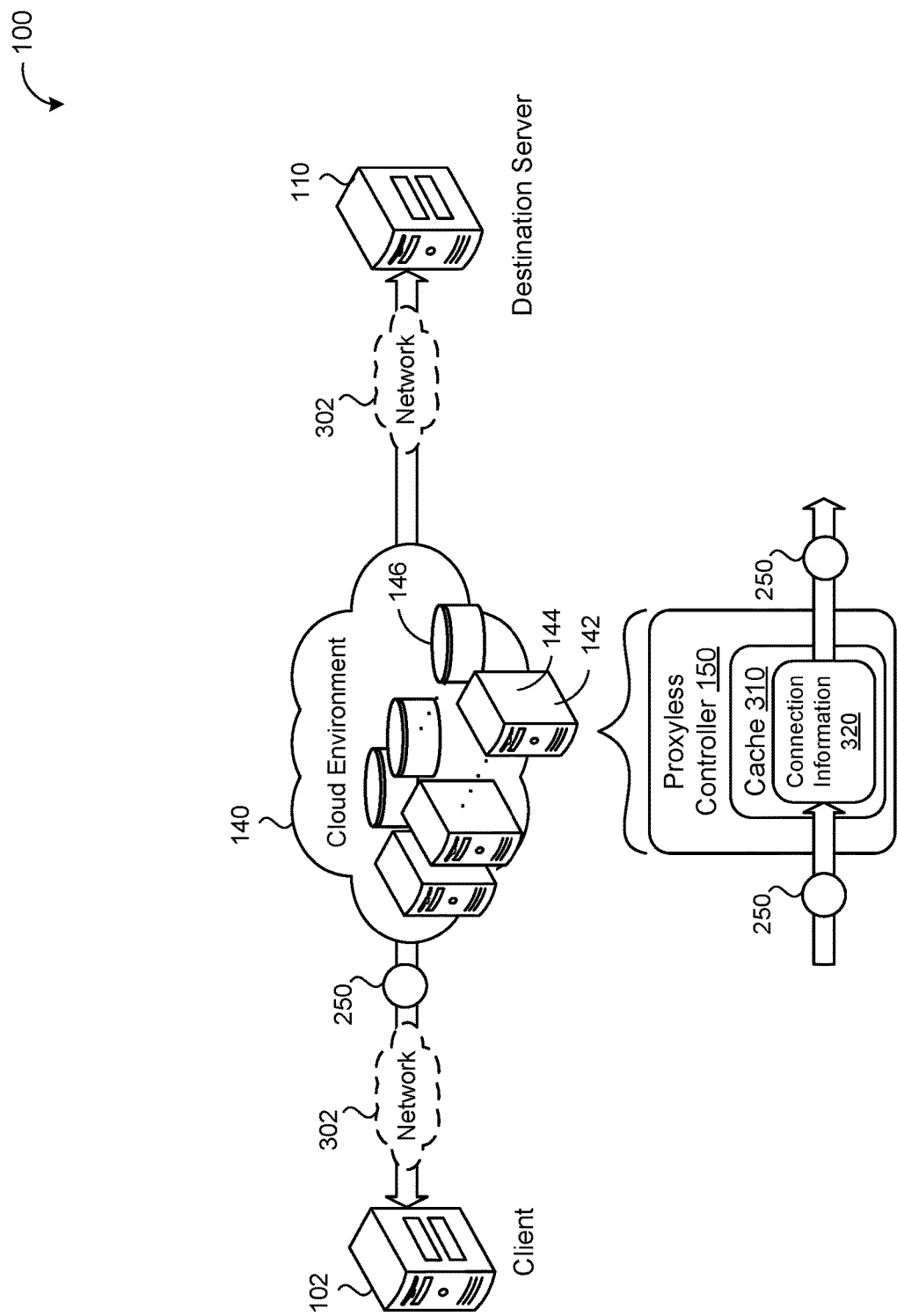
FIG. 3 is a schematic view of exemplary components of the system of FIG. 1.

Referring now to FIG. 3, conventional techniques typically require the proxy (or other intermediary) to continually modify packets of data transmitted between the client 102 and the destination server 110. In some examples, the proxyless controller 150 includes cache 310 that caches connection information 320. The connection information 320 identifies TCP connections between the client 102 and the destination server 110. As TCP packets 250 (i.e., data packets 250) are transmitted from the client 102 to the destination server 110 (and vice versa), the proxyless controller 150 may receive the TCP packets 250 and determine, based on the connection information 320, that the TCP packet 250 is part of an existing TCP connection and is destined for the client 102 or the destination server 110. When the proxyless controller 150 determines the TCP packet 250 is part of an existing connection, the proxyless controller 150 may forward the TCP packet 250. In order to avoid reducing throughput, the proxyless controller 150 may store the connection information 320 in the cache 310, allowing the proxyless controller 150 to quickly and efficiently determine if the TCP packet 250 is associated with any of the connections stored in the cache 310. When the connection information 320 confirms that an incoming data packet 250 is part of an existing TCP connection, the proxyless controller 150 forwards the data packet 250 on to the proper destination without any further inspection or modification of the data packet 250.

Thus, the system provides a proxyless protocol to allow existing proxy-based deployments to switch to proxyless deployments (e.g., SDNs) without need for reconfiguration. The system delivers at or near line-rate packet processing by requiring minimal packet intervention. Instead of modifying all packets, the system modifies sequence numbers (or other protocol-specific means for tracking data) so that only a small number of packets at the beginning of the connection require modification. Afterward, the system may use caching mechanisms for ongoing flows of data to maintain a high data rate.

Figure 4:
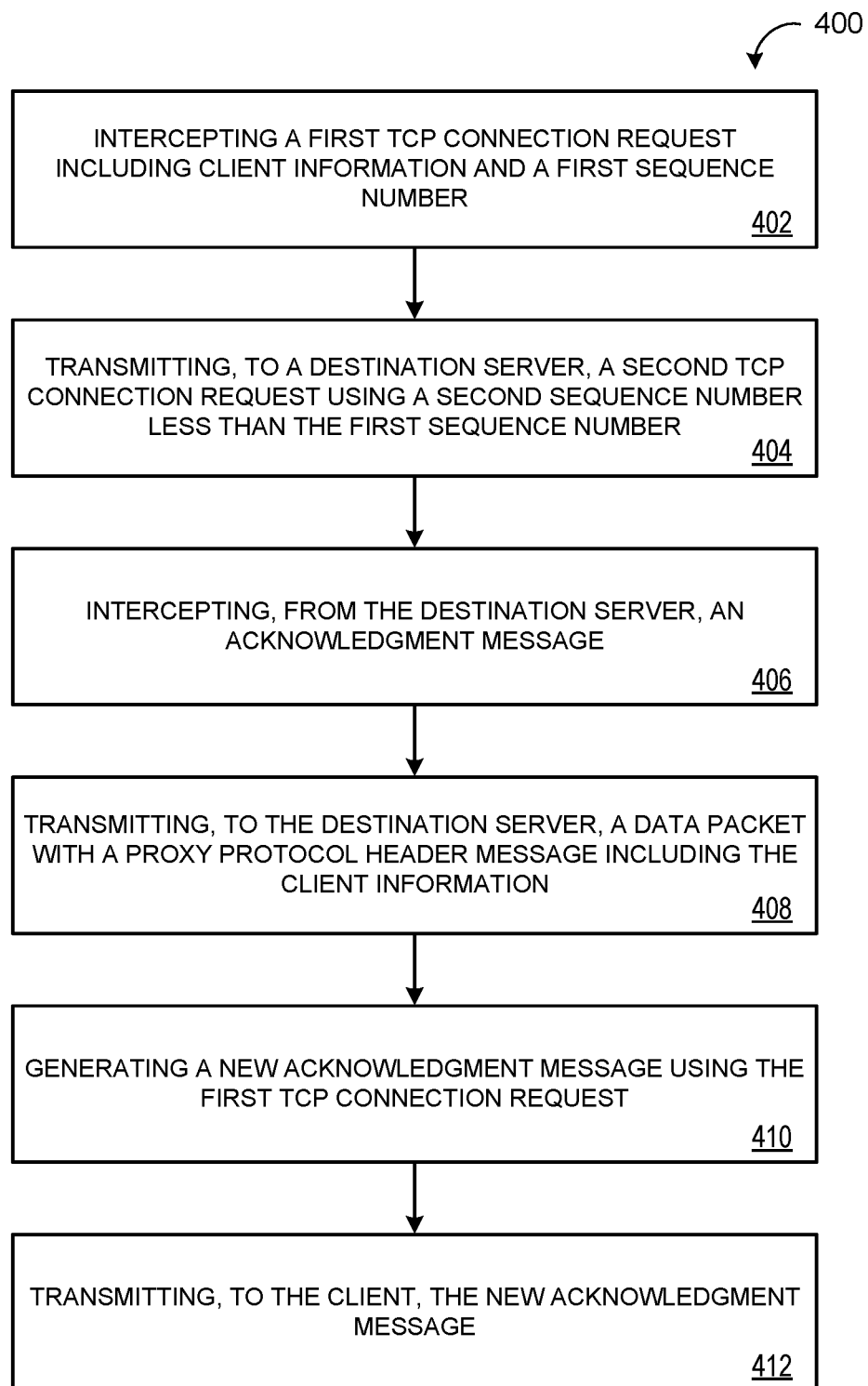
FIG. 4 is a flowchart of an example arrangement of operations for a method of providing a proxyless protocol.

FIG. 4 is a flowchart of an exemplary arrangement of operations for a method 400 for a proxyless protocol. The method 400 includes, at operation 402 intercepting, from a client 102, a first TCP connection request 210A requesting to establish a first TCP connection between the client 102 and a proxy server for routing data through the proxy server to a destination server 110. The first TCP connection request 110A includes client information 104 and a first sequence number 212A. At operation 404, the method 400 includes transmitting, to the destination server 110, a second TCP connection request 210B requesting to establish a second TCP connection between the client 102 and the destination server 110. In some examples, the second TCP connection request 210B is a modified form of the intercepted first TCP connection request 210A. The second TCP connection request 210B includes a second sequence number 212B less than the first sequence number 212A. The method 400, at operation 406, includes intercepting, from the destination server 110, an acknowledgment message 220A indicating acknowledgment of the second TCP connection request 210B. At operation 408, the method 400 includes transmitting, to the destination server 110, a data packet comprising a proxy protocol header 230 that includes the client information 104. The method 400, at operation 410, includes generating a new acknowledgment message 220C using the first TCP connection request 210A and transmitting, to the client 102, the new acknowledgment message 220C.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   intercepting, from a client, a first Transmission Control Protocol (TCP) connection request requesting to establish a first TCP connection between the client and a proxy server for routing data through the proxy server to a destination server, the first TCP connection request comprising client information and a first sequence number;
   transmitting, to the destination server, a second TCP connection request requesting to establish a second TCP connection between the client and the destination server, the second TCP connection request comprising a second sequence number less than the first sequence number;
   intercepting, from the destination server, a first acknowledgment message indicating acknowledgment of the second TCP connection request;
   transmitting, to the destination server, a data packet comprising a proxy protocol header message within a data payload of the data packet, the proxy protocol header message comprising the client information;
   intercepting, from the destination server, a second acknowledgment message indicating acknowledgment of the data packet, the second acknowledgment message comprising a first acknowledgment number;
   generating a third acknowledgment message using the first TCP connection request, the third acknowledgment message comprising a second acknowledgment number based on the first acknowledgment number;
   transmitting, to the client, the third acknowledgment message;
   storing, at a cache in communication with the data processing hardware, connection information identifying one or more TCP connections between the client and the destination server; and
   after transmitting the third acknowledgment message:
      intercepting, from the client, a TCP packet for the proxy server;
      retrieving the connection information from the cache;
      determining that the TCP packet is associated with a respective one of the one or more TCP connections of the retrieved connection information; and
      based on determining that the TCP packet is associated with the respective one of the one or more TCP connections of the connection information, forwarding the TCP packet to the destination server without modification to the TCP packet and without reconfiguration of the respective one of the one or more TCP connection.

2. The method of claim 1, wherein the operations further comprise, prior to intercepting the TCP connection request from the client, obtaining client configuration data that indicates an intent of the client to communicate with the proxy server.

3. The method of claim 2, wherein:
   the client configuration data comprises a destination identifier that identifies the destination server; and
   the operations further comprise, after intercepting the TCP connection request from the client, determining that the client intends to communicate with the proxy server using the destination identifier.

4. The method of claim 3, wherein the destination identifier comprises an Internet Protocol (IP) address.

5. The method of claim 1, wherein intercepting the first TCP connection request from the client comprises determining that a SYN flag is set within the first TCP connection request.

6. The method of claim 1, wherein a difference between the first sequence number and the second sequence number is equal to a size of the proxy protocol header message.

7. The method of claim 1, wherein:
the first acknowledgment message comprises connection configuration information; and
the third acknowledgment message comprises the same connection configuration information as the first acknowledgment message.

8. The method of claim 1, wherein, after transmitting the third acknowledgment message to the client, the client and the destination server communicate directly without modifications by the data processing hardware.

9. The method of claim 1, wherein:
the client is remote from the destination server; and
the first TCP connection request is intercepted at the client.

10. The method of claim 1, wherein:
the client is remote from the destination server; and
the first TCP connection request is intercepted at the destination server.

11. A system comprising:
data processing hardware; and
memory hardware in communication with the data processing hardware, the memory hardware storing instructions that when executed on the data processing hardware cause the data processing hardware to perform operations comprising:
intercepting, from a client, a first Transmission Control Protocol (TCP) connection request requesting to establish a first TCP connection between the client and a proxy server for routing data through the proxy server to a destination server, the first TCP connection request comprising client information and a first sequence number;
transmitting, to the destination server, a second TCP connection request requesting to establish a second TCP connection between the client and the destination server, the second TCP connection request comprising a second sequence number less than the first sequence number;
intercepting, from the destination server, a first acknowledgment message indicating acknowledgment of the second TCP connection request;
transmitting, to the destination server, a data packet comprising a proxy protocol header message within a data payload of the data packet, the proxy protocol header message comprising the client information;
intercepting, from the destination server, a second acknowledgment message indicating acknowledgment of the data packet, the second acknowledgment message comprising a first acknowledgment number;
generating a third acknowledgment message using the first TCP connection request, the third acknowledgment message comprising a second acknowledgment number based on the first acknowledgment number;
transmitting, to the client, the third acknowledgment message;
storing, at a cache in communication with the data processing hardware, connection information identifying one or more TCP connections between the client and the destination server; and
after transmitting the third acknowledgment message:
intercepting, from the client, a TCP packet for the proxy server;
retrieving the connection information from the cache;
determining that the TCP packet is associated with a respective one of the one or more TCP connections of the retrieved connection information; and
based on determining that the TCP packet is associated with the respective one of the one or more TCP connections of the connection information, forwarding the TCP packet to the destination server without modification to the TCP packet and without reconfiguration of the respective one of the one or more TCP connection.

12. The system of claim 11, wherein the operations further comprise, prior to intercepting the TCP connection request from the client, obtaining client configuration data that indicates an intent of the client to communicate with the proxy server.

13. The system of claim 12, wherein:
the client configuration data comprises a destination identifier that identifies the destination server; and
the operations further comprise, after intercepting the TCP connection request from the client, determining that the client intends to communicate with the proxy server using the destination identifier.

14. The system of claim 13, wherein the destination identifier comprises an Internet Protocol (IP) address.

15. The system of claim 11, wherein intercepting the first TCP connection request from the client comprises determining that a SYN flag is set within the first TCP connection request.

16. The system of claim 11, wherein a difference between the first sequence number and the second sequence number is equal to a size of the proxy protocol header message.

17. The system of claim 11, wherein:
the first acknowledgment message comprises connection configuration information; and
the third acknowledgment message comprises the same connection configuration information as the first acknowledgment message.

18. The system of claim 11, wherein, after transmitting the third acknowledgment message to the client, the client and the destination server communicate directly.

19. The system of claim 11, wherein:
the client is remote from the destination server; and
the first TCP connection request is intercepted at the client.

20. The system of claim 11, wherein:
the client is remote from the destination server; and
the first TCP connection request is intercepted at the destination server.

* * * * *